United States Patent [19]

Krüger et al.

[11] 4,288,179
[45] Sep. 8, 1981

[54] CUTTING TOOL BIT

[75] Inventors: Heinrich Krüger, Essen; Hans Tack, Velbert, both of Fed. Rep. of Germany

[73] Assignee: Fried. Krupp GmbH, Essen, Fed. Rep. of Germany

[21] Appl. No.: 16,945

[22] Filed: Mar. 2, 1979

[30] Foreign Application Priority Data

Mar. 13, 1978 [DE] Fed. Rep. of Germany ....... 2810824

[51] Int. Cl.$^3$ .............................................. B26D 1/00
[52] U.S. Cl. .................................................. 407/114
[58] Field of Search .................................... 407/114

[56] References Cited
U.S. PATENT DOCUMENTS 3,395,434  8/1968  Wirfelt .............................. 407/114
3,399,442  9/1968  Jones et al. ....................... 407/114
3,882,580  5/1975  Lundgren .......................... 407/114

Primary Examiner—Leonidas Vlachos
Attorney, Agent, or Firm—Spencer & Kaye

[57] ABSTRACT

A cutting tool bit has a central mounting hole, a planar bottom face and an opposite top face having a central zone situated at a lower level than the marginal zones thereof; chip breaking elements formed on the top face; and lateral faces each defining a cutting edge with the top face. Each cutting edge has linear length portions sloping from opposite ends of the cutting edge in the direction of its middle towards the bottom face. There is further provided an elevation situated in the central zone of the top face and a plurality of surfaces each situated between a respective cutting edge and the elevation. The chip breaking elements are formed by the surfaces and the elevation.

13 Claims, 6 Drawing Figures

CUTTING TOOL BIT

BACKGROUND OF THE INVENTION

This invention relates to a cutting tool bit for single-sided use, having a central mounting hole, a planar bottom face as a support face and a top face which is located opposite the bottom face and the center of which is depressed with respect to its edge zones. The top face has chip breaking elements and forms cutting edges with the lateral faces of the tool bit. The cutting tool bit is tightened in a cutting tool by a clamping element and it utilized for machining steel and iron workpieces.

Cutting tool bits of the above-outlined type having diverse chip breaking elements are known. Thus, cutting tool bits are widely used which have uniformly shaped chip breaker grooves extending peripherally on the top face of the tool bit. Further, cutting tool bits are known in which the cutting edges slope downwardly or upwardly from the corners to the middle of the cutting edge and wherein parts of the top face function as a chip breaker element. It is a disadvantage of the known cutting tool bits that the quality of the chip breaking depends from the cutting depth; an optimal chip breaking effect is, as a rule, achieved when the cutting depth is approximate ¼ of the length of the cutting edge. By increasing the feeding speed, it is possible, to be sure, to improve the chip breaking effect even in case of greater cutting depth. In a substantial number of machining operations (for example, turning in shoulder zones), however, it is not feasible to increase the feeding speed.

SUMMARY OF THE INVENTION

It is an object of the invention to provide an improved cutting tool bit of the above-outlined type which has a significant resistance to breakage and the chip breaking elements of which effect a favorable chip formation and reduce the cutting forces.

This object and others to become apparent as the specification progresses, are accomplished by the invention, according to which, briefly stated, at least a portion of each cutting edge extends linearly downwardly from the corners to the edge middle and the chip breaking elements are constituted by surfaces situated between the cutting edges and the center of the top face as well as by an elevation situated in the center of the top face.

By virtue of the cutting tool bit structured according to the invention, in case of a changing cutting depth and different feed velocities, there is achieved a very satisfactory chip breaking effect which remains uniform to a large measure, because the elevation becomes effective as a chip breaking element only at greater cutting depths.

According to a particularly advantageous feature of the invention, the upper surface of the elevation extends parallel to the bottom face of the cutting tool bit and further, the upper surface of the elevation is situated at a lower level than the lowest point of the cutting edges.

According to a further feature of the invention, the elevation is a polygon which corresponds to the outline of the cutting tool bit. The size of the circle circumscribable about the polygon corresponds approximately to the circle inscribable in the cutting tool bit and further, the sides of the polygon are nonparallel to the cutting edges. It is particularly expedient to so orient the polygonal elevation that its corners are oriented towards the center of the cutting edges.

According to a further feature of the invention, the elevation is an annulus whose outer diameter is smaller than the diameter of the circle inscribable in the cutting tool bit and further, at the annulus, there are arranged equally spaced prolongations. The number of prolongations is identical to the number of cutting edges.

According to a further feature of the invention which particularly enhances the quality of the chip formation, the surfaces situated between the cutting edges and the center of the top face have an angular cutoff; the rake angle bounding the cutting edge is smaller than that bounding the center of the top face. An appreciable decrease of the cutting forces occurs in case the rake angles have a magnitude of from 15° to 30°.

According to a further feature of the invention, the downwardly sloping portions of the cutting edges form an angle of 4° to 8°, preferably 6° with the bottom face. By virtue of this feature, the angle of inclination in cutting tool bits having a prismatic (negative) outline is approximately 0° in the mounted state. Therefore, almost no radial cutting forces are generated which is advantageous when thin and unstable components are machined. Further, the chips fly away from the workpiece and therefore cannot damage the machined workpiece face.

According to a further feature of the invention, the cutting edges are provided with a chamfer which preferably is narrower in the corner zone than in the central zone. By structuring the chamfer wider along the midportion of the respective cutting edge, an edge stabilization of the cutting edges is achieved, while the narrower chamfer portion in the corner zones of the cutting edges results in an advantageous effect on the chip formation in case of smaller feeds and shallower cutting depths.

DESCRIPTION OF THE PREFERRED EMBODIMENTS

The cutting tool bits structured according to the invention may have a triangular or quadrangular (rhomboidal or quadratic) shape and are preferably made of hard metal or an appropriate cutting material. The cutting tool bits are usuable for a cutting machining of steel and iron workpieces, particularly of low-strength steels as well as high-alloyed and stainless materials.

Figure 1:
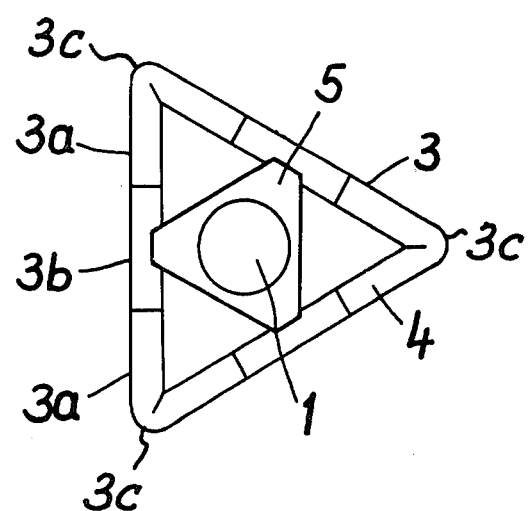
FIG. 1 is a top plan view of a preferred embodiment of the invention.
Figure 2:
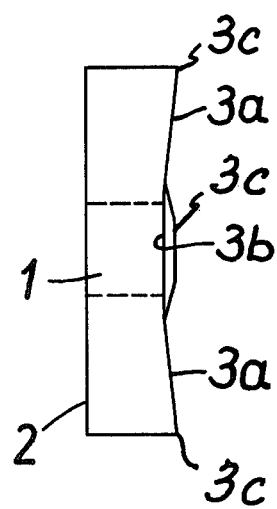
FIG. 2 is a side elevational view of the structure shown in FIG. 1.

The cutting tool bit illustrated in FIGS. 1 and 2 is designed for single-sided use and is of triangular configuration. It has a mounting hole 1 and a bottom face 2 which serves as a support face. The top face of the cutting tool bit forms, with the lateral faces of the tool bit, the cutting edges 3. The cutting tool bit is positioned in a conforming recess of a cutting tool and is tightened thereto by a securing element projecting into the mounting hole 1. The cutting tool and the securing element are not shown.

Each cutting edge 3 is composed of two flanking edge portions 3a and a central edge portion 3b. The flanking edge portions 3a slope from their respective ends towards the bottom face 2 and define with the latter of an angle of 4° to 8°. Each central cutting edge portion 3b extends parallel to the bottom face 2. It is, however, feasible to so construct the cutting tool bit that the cutting edges 3 have no central cutting edge portion 3b but they consist solely of two linearly sloping cutting edge portions 3a. The cutting edge portions 3a of two adjoining sides of the cutting tool bit converge and define respective corners 3c. It is further feasible to round the corners of the cutting tool bit and to provide that the portions of the cutting edges 3 that lie within the rounded parts extend parallel to the bottom face 2.

The top face of the cutting tool bit moreover carries diverse types of chip breaking elements which are constituted by surfaces 4 situated between the cutting edges 3 and the center zone of the top face as well as by a centrally situated triangular elevation 5. The surfaces 4 have a rake angle of 15° to 30°. The upper surface of the elevation 5 extends parallel to the bottom face 2 and is situated lower than the lowest point of the cutting edges 3. The corners of the triangular elevation 5 are oriented towards the middle of the respective cutting edge 3.

Turning now to FIGS. 3, 4, 5 and 6 the triangular cutting tool bit illustrated therein differs from the embodiment shown in FIGS. 1 and 2 in that there is provided a central annular elevation 8 which has three generally radially outwardly directed projections 8a oriented towards the middle of the respective three cutting edges 3. The upper face of the annulus 8 is, as seen in sectional FIG. 6, situated lower than the lowest point of the cutting edges 3. The top face of the cutting tool bit includes planar surfaces 9 and 10 which, together with respective cutting edges 3a and 3b, bound the chip breaker surfaces 4 and which extend approximately parallel to the respective cutting edges 3l, 3b.

Figure 3:
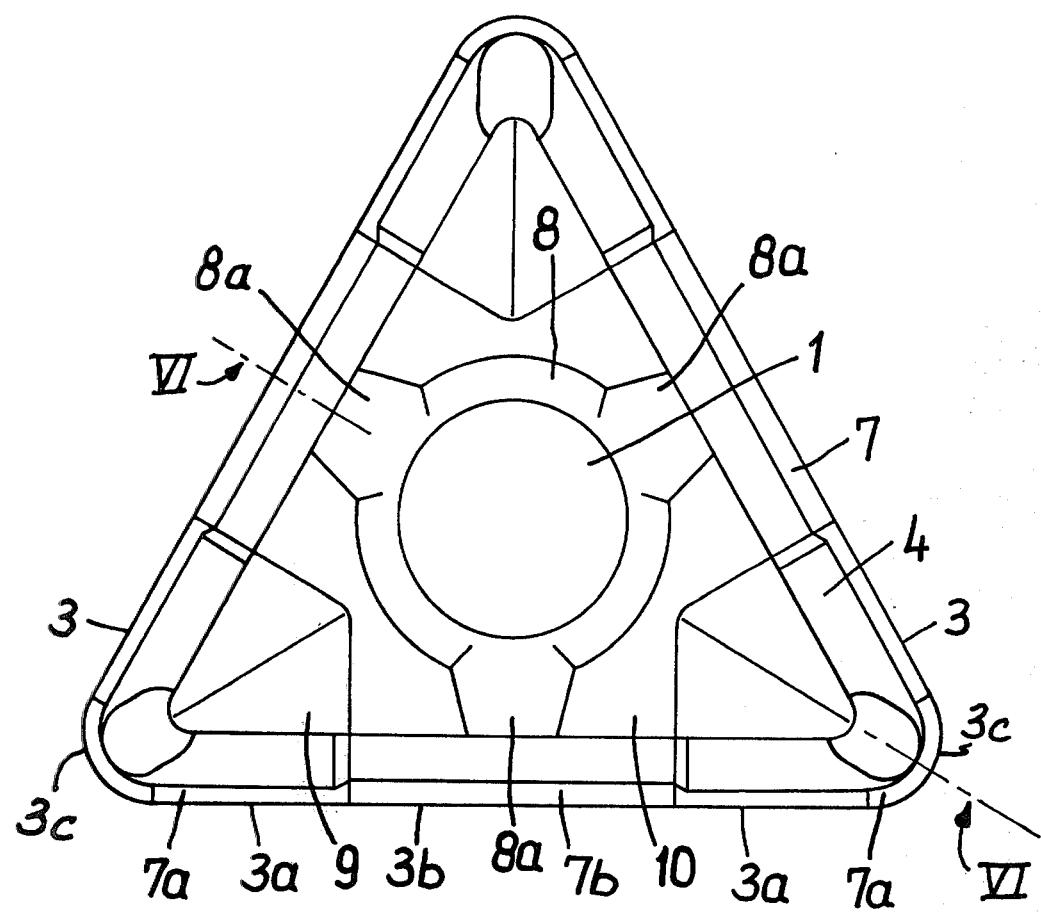
FIG. 3 is a top plan view of another preferred embodiment of the invention.
Figure 6:
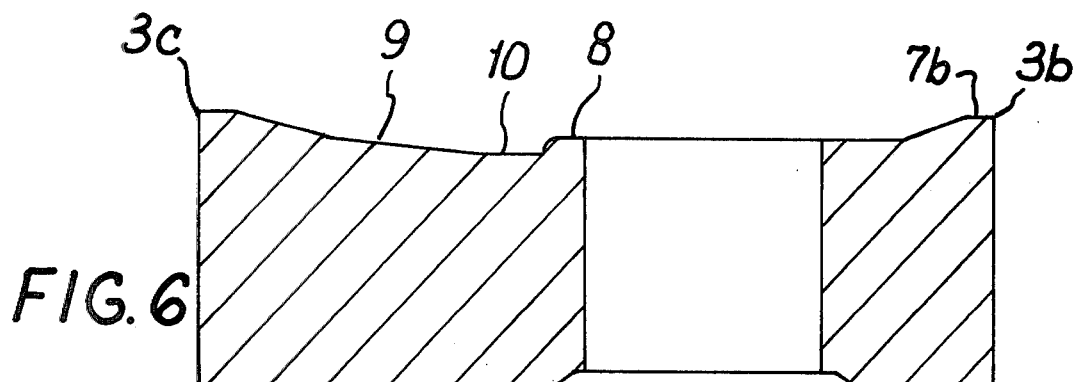
FIG. 6 is a sectional view taken along line VI—VI of FIG. 3.
Figure 4:
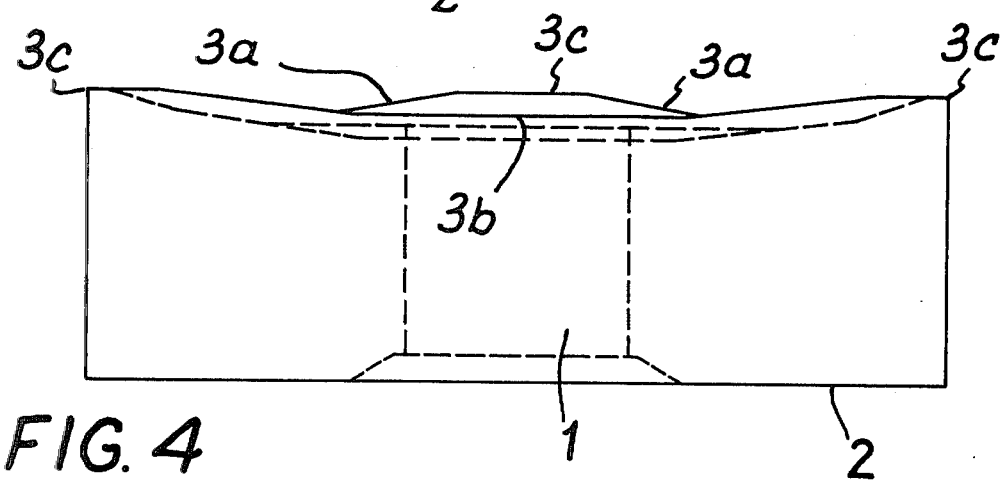
FIG. 4 is a side elevational view of the structure shown in FIG. 3.

The cutting edges 3 of the cutting tool bit illustrated in FIGS. 3 and 4 are protected by chamfers 7 whose corner zones 7a are narrower than a central chamfer zone 7b. Advantageously, the central chamfer zone 7b is 50% wider than the corner zones 7a.

Figure 5:
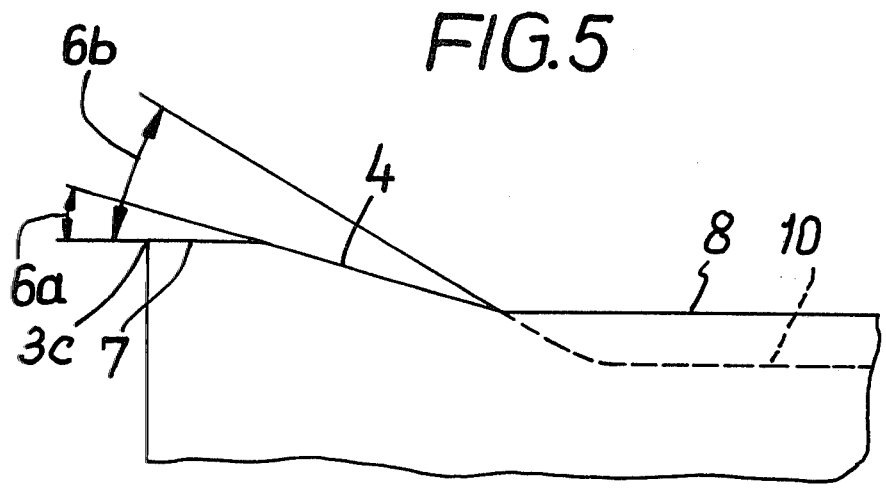
FIG. 5 is an enlarged side elevational view of a detail of the embodiment shown in FIG. 3.

FIG. 4 and particularly FIG. 5 illustrate that the surfaces 4 may have two different rake angles 6a and 6b having a magnitude, for example, of 15° and 30°, respectively. Thus, the rake angle 6a adjoining the respective cutting edge 3 is similar than the rake angle 6b adjoining the center zone of the top face of the cutting tool bit.

It is to be understood that a dual rake angle 6a, 6b as well as the chamfer 7 described in connection with the second embodiment may be incorporated into the first embodiment of FIGS. 1 and 2 as well.

It is to be understood that the above description of the present invention is susceptible to various modifications, changes and adaptations and the same are intended to be comprehended within the meaning and range of equivalents of the appended claims.

What is claimed is:

1. In a cutting tool bit having a central mounting hole, a planar bottom face and an opposite top face having a central zone situated at a lower level than the marginal zones thereof; chip breaking elements formed on the top face; and lateral faces defining cutting edges with the top face; the improvement wherein each cutting edge has linear length portions sloping from opposite ends of the cutting edge in the direction of its middle towards said bottom face; the improvement further comprising an elevation situated in said central zone and having an upper surface located at a lower level than the lowest point of said cutting edges; and a plurality of surfaces each situated between a respective said cutting edge and said elevation; said chip breaking elements being formed by said surfaces and said elevation.

2. A cutting tool bit as defined in claim 1, wherein said central zone of the top face extends parallel to said cutting edges.

3. A cutting tool bit as defined in claim 1, wherein the upper surface of said elevation extends parallel to said bottom face.

4. A cutting tool bit as defined in claim 1, wherein said elevation has a polygonal outline corresponding in shape to that of the cutting tool bit and wherein the size of a circle circumscribable about the polygonal elevation approximates the size of a circle inscribable into said cutting tool bit and further wherein the sides of the polygonal elevation extend nonparallel to said cutting edges.

5. A cutting tool bit as defined in claim 4, wherein the corners of the polygonal elevation are oriented towards the middle of the respective cutting edges.

6. A cutting tool bit as defined in claim 1, wherein said elevation is an annulus whose outer diameter is smaller than that of a circle inscribable into said cutting tool bit; the improvement further comprising a plurality of uniformly spaced projections on said annulus; the number of said projections equals the number of said cutting edges.

7. A cutting tool bit as defined in claim 6, wherein each projection is oriented towards the middle of the respective cutting edge.

8. A cutting tool bit as defined in claim 1, wherein each said surface has angled-off surface portions to define a first rake angle adjoining the respective cutting edge and a second rake angle adjoining said central zone of said top face and wherein said first rake angle is smaller than said second rake angle.

9. A cutting tool bit as defined in claim 8, wherein said first and second rake angles have a magnitude of 15° to 30°.

10. A cutting tool bit as defined in claim 1, wherein each said linear length portion defines an angle of 4° to 8° with said bottom face.

11. A cutting tool bit as defined in claim 10, wherein said angle is 6°.

12. A cutting tool bit as defined in claim 1, wherein each cutting edge has a chamfer.

13. A cutting tool bit as defined in claim 12, wherein the width of the chamfer is greater along a central portion of the respective cutting edge than along end portions thereof.

* * * * *